United States Patent
Tabikh et al.

(10) Patent No.: US 10,415,834 B2
(45) Date of Patent: Sep. 17, 2019

(54) TEMPERING AIR SYSTEM FOR GAS TURBINE SELECTIVE CATALYST REDUCTION SYSTEM

(71) Applicant: General Electric Technology GmbH, Baden (CH)

(72) Inventors: Alimustapha Tabikh, Vaxjo (SE); Francesca Piaggi, Sesto San Giovanni (IT); Lars-Erik Johansson, Vaxjo (SE); Peter Lars Nilsson, Vaxjo (SE)

(73) Assignee: General Electric Technology GmbH, Baden (CH)

( * ) Notice: Subject to any disclaimer, the term of this patent is extended or adjusted under 35 U.S.C. 154(b) by 479 days.

(21) Appl. No.: 15/334,900

(22) Filed: Oct. 26, 2016

(65) Prior Publication Data

US 2018/0112881 A1 Apr. 26, 2018

(51) Int. Cl.
| | | |
|---|---|---|
| *F01D 25/30* | (2006.01) | |
| *F23R 3/40* | (2006.01) | |
| *F02C 7/141* | (2006.01) | |
| *F23R 3/28* | (2006.01) | |
| *F01N 3/20* | (2006.01) | |

(Continued)

(52) U.S. Cl.
CPC ............ *F23R 3/40* (2013.01); *B01D 53/8631* (2013.01); *B01F 3/02* (2013.01); *B01F 5/0451* (2013.01); *B01F 5/0456* (2013.01); *B01F 5/0463* (2013.01); *B01F 5/0618* (2013.01); *B01F 5/0653* (2013.01); *F01D 25/305* (2013.01); *F01N 3/02* (2013.01); *F01N 3/2066* (2013.01); *F01N 3/2892* (2013.01); *F01N 3/30* (2013.01); *F02C 7/141* (2013.01); *F23R 3/286* (2013.01); *B01D 2251/2062* (2013.01); *B01D 2251/2067* (2013.01); *B01D 2258/01* (2013.01); *B01D 2258/0283* (2013.01); *F01N 2240/20* (2013.01);

(Continued)

(58) Field of Classification Search
CPC ......... F02C 7/141; F01D 25/30; F01D 25/305
See application file for complete search history.

(56) References Cited

U.S. PATENT DOCUMENTS

| | | | |
|---|---|---|---|
| 9,616,396 B2 * | 4/2017 | Nande | B01F 5/0268 |
| 2006/0279145 A1 | 12/2006 | De Bock | |

(Continued)

FOREIGN PATENT DOCUMENTS

| | | |
|---|---|---|
| EP | 2120314 | 11/2009 |
| EP | 2 354 495 A2 | 8/2011 |
| EP | 1997209 | 12/2011 |

OTHER PUBLICATIONS

International Search Report and Written Opinion issued in connection with corresponding PCT Application No. PCT/EP2017/077347 dated Jan. 22, 2018.

*Primary Examiner* — Gerald L Sung
(74) *Attorney, Agent, or Firm* — Eversheds Sutherland (US) LLP

(57) ABSTRACT

The present application provides a selective catalyst reduction system for use with a combustion gas stream. The selective catalyst reduction system may include a tempering air system with a finger mixer and a number of mixing boxes positioned downstream of the finger mixer and a catalyst positioned downstream of the tempering air system. The tempering air system cools the combustion gas stream and evens out the temperature profile before the combustion gas stream reaches the catalyst.

17 Claims, 5 Drawing Sheets

(51) Int. Cl.

| | |
|---|---|
| *F01N 3/28* | (2006.01) |
| *F01N 3/30* | (2006.01) |
| *F01N 3/02* | (2006.01) |
| *B01F 5/04* | (2006.01) |
| *B01F 5/06* | (2006.01) |
| *B01D 53/86* | (2006.01) |
| *B01F 3/02* | (2006.01) |

(52) U.S. Cl.
CPC ...... *F01N 2270/02* (2013.01); *F05D 2220/32* (2013.01); *Y02T 10/24* (2013.01)

(56) References Cited

U.S. PATENT DOCUMENTS

| | | | |
|---|---|---|---|
| 2007/0028622 A1* | 2/2007 | Steyer | F02K 1/48 60/772 |
| 2007/0068167 A1* | 3/2007 | Patel | F01D 25/26 60/772 |
| 2010/0283335 A1 | 11/2010 | Salamah | |
| 2011/0036066 A1 | 2/2011 | Zhang et al. | |
| 2011/0061374 A1 | 3/2011 | Noritake | |
| 2012/0101768 A1 | 4/2012 | Binu | |
| 2014/0232220 A1 | 8/2014 | Srinivasan | |
| 2015/0162804 A1 | 6/2015 | Tolpadi | |
| 2015/0330274 A1 | 11/2015 | Miyanishi et al. | |
| 2016/0376956 A1* | 12/2016 | Kulkarni | F01D 25/305 60/39.5 |
| 2017/0335734 A1 | 11/2017 | Tabikh et al. | |

\* cited by examiner

TEMPERING AIR SYSTEM FOR GAS TURBINE SELECTIVE CATALYST REDUCTION SYSTEM

TECHNICAL FIELD

The present application and the resultant patent relate generally to gas turbine engines and more particularly relate to a tempering air system for reducing the temperature of hot combustion gases upstream of a catalyst in a gas turbine selective catalyst reduction system.

BACKGROUND OF THE INVENTION

In the combustion process of a gas turbine engine, nitrogen oxides and other types of regulated emissions are produced. One solution for reducing the overall levels of nitrogen oxide emissions is the use of a selective catalyst reduction system. Generally described, the selective catalyst reduction system adds a reductant, typically ammonia or urea, to the combustion gas stream before passing the stream through a catalyst bed so as to absorb selectively the nitrogen oxides and the reducing agent. The absorbed components undergo a chemical reaction on the catalyst surface and the reaction products are desorbed. Specifically, the reactant reacts with the nitrogen oxides in the combustion gas stream to form water and nitrogen. Other types of catalysts and other types of reductants may be used.

The overall efficiency of the selective catalyst reduction system may depend in part on the temperature of the combustion gas stream. Specifically, the efficient temperature range of the selective catalyst reduction system may be relatively narrow. As such, the hot combustion gas stream generally should be cooled before reaching the catalyst. Moreover, the gas stream should have a substantially even temperature profile before reaching the catalyst.

SUMMARY OF THE INVENTION

The present application and the resultant patent provide a selective catalyst reduction system for use with a combustion gas stream. The selective catalyst reduction system may include a tempering air system with a finger mixer and a number of mixing boxes positioned downstream of the finger mixer and a catalyst positioned downstream of the tempering air system. The tempering air system cools the combustion gas stream and evens out the overall temperature profile before the combustion gas stream reaches the catalyst.

The present application and the resultant patent further provide a method of operating a selective catalyst reduction system with a combustion gas stream. The method may include the steps of flowing the combustion gas stream into the selective catalyst reduction system, injecting a cooling air stream into the combustion gas stream, mixing the combustion gas stream and the cooling air stream in a number of mixing boxes, and reacting the mixed stream in a catalyst.

The present application and the resultant patent further provide a tempering air system for use with a combustion gas stream entering a selective catalyst reduction system. The tempering air system may include a cooling air stream, a finger mixer for injecting the cooling air stream into the combustion gas stream, and a number of mixing boxes positioned downstream of the finger mixer to mix the cooling air stream and the combustion gas stream into a substantially uniform profile.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
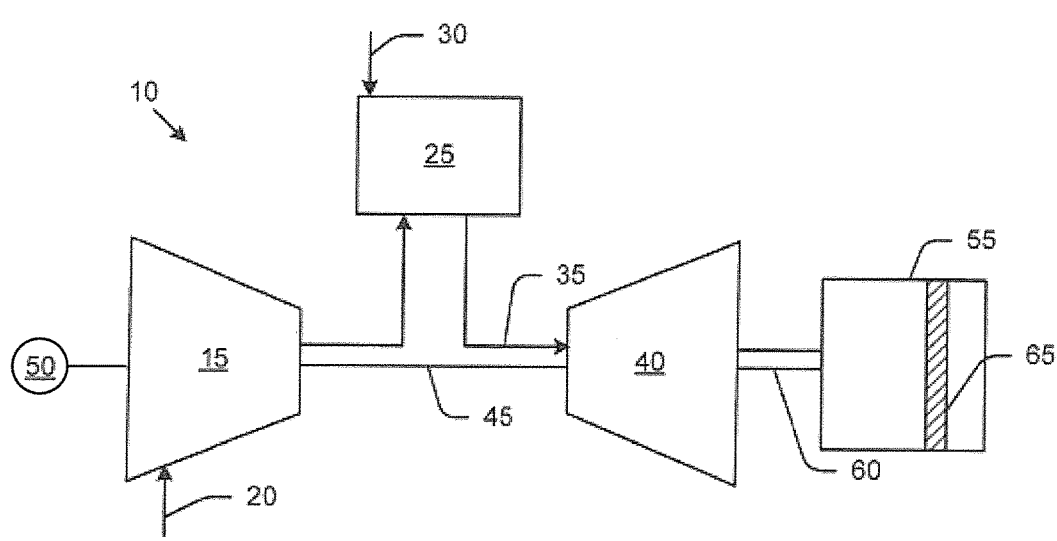
FIG. 1 is a schematic diagram of a gas turbine engine showing a compressor, a combustor, a turbine, a load, and a selective catalyst reduction system.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 positioned in a circumferential array and the like. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, liquid fuels, and/or other types of fuels and blends thereof. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 also may include a selective catalyst reduction system 55. The selective catalyst reduction system 55 may be positioned downstream of the turbine 40 and may be in communication with the combustion gas stream 35 via a length of ducting 60 and the like. As described above, the selective catalyst reduction system 55 may include a catalyst 65 therein so as to react with the combustion gas stream 35. Many different types of selective catalyst reduction system 55 and catalysts 65 may be used herein.

Figure 2:
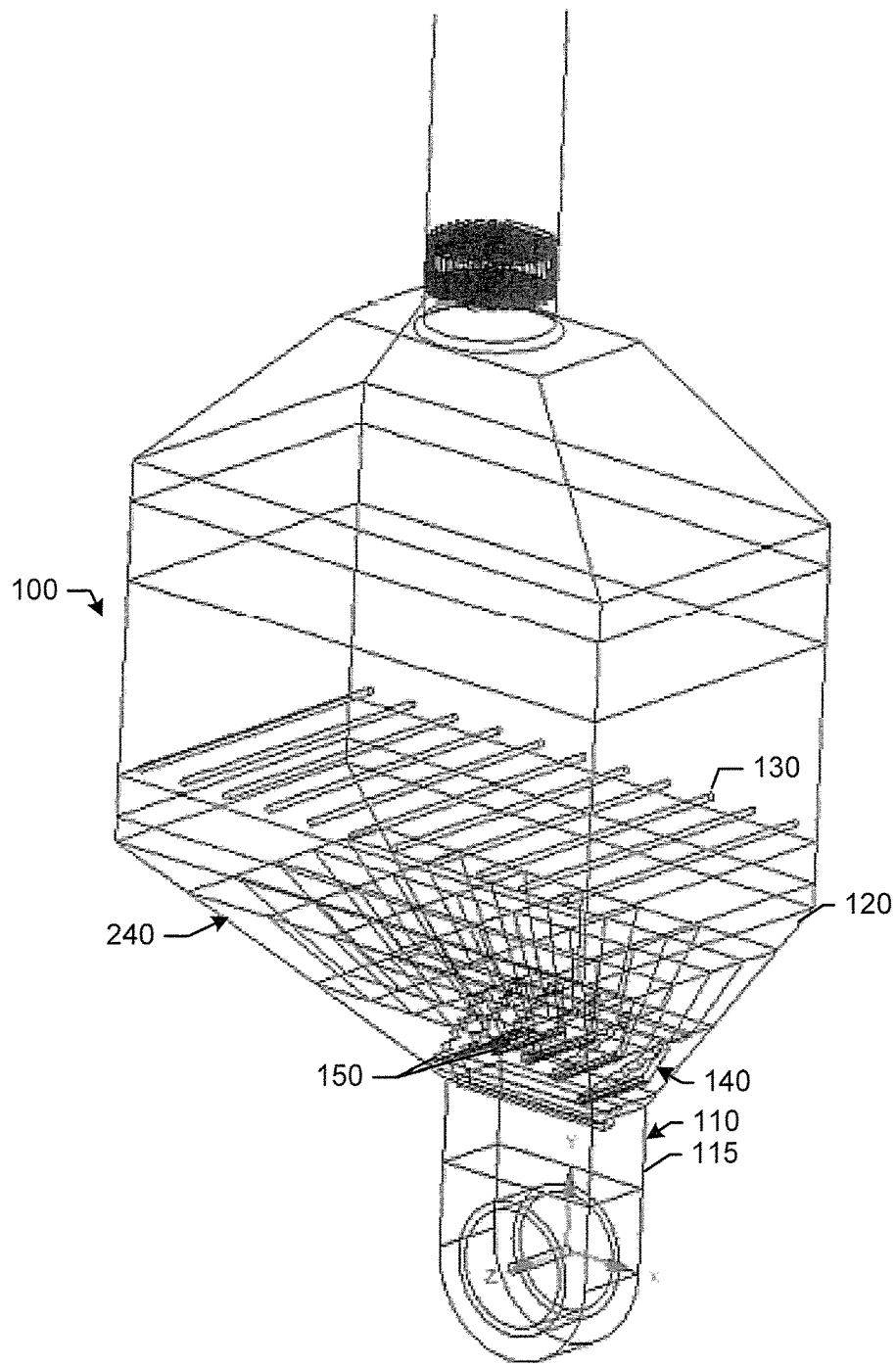
FIG. 2 is a perspective view of a selective catalyst reduction system as may be described herein.
Figure 3:
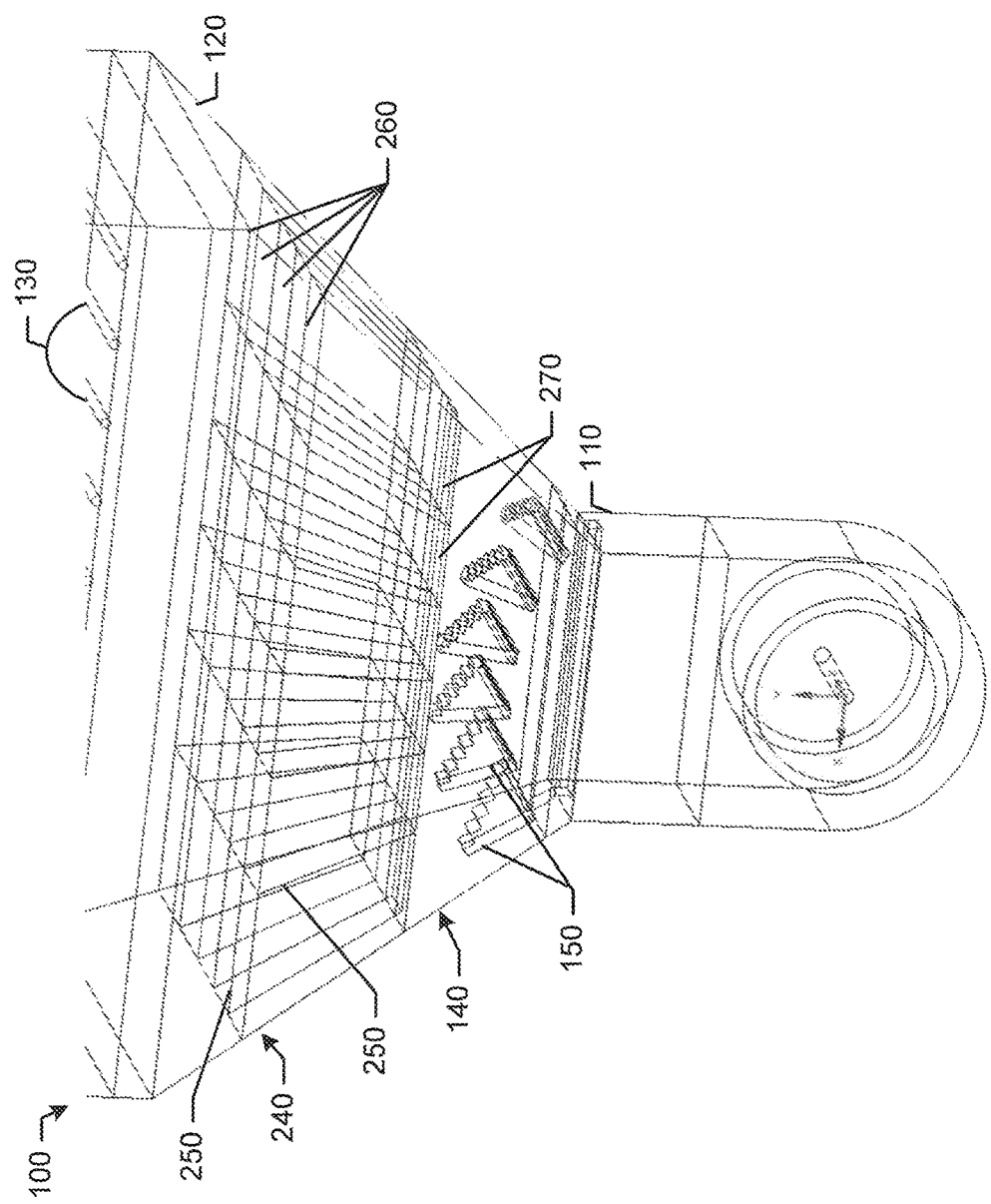
FIG. 3 is a further perspective view of the selective catalyst reduction system of FIG. 2.
Figure 4:
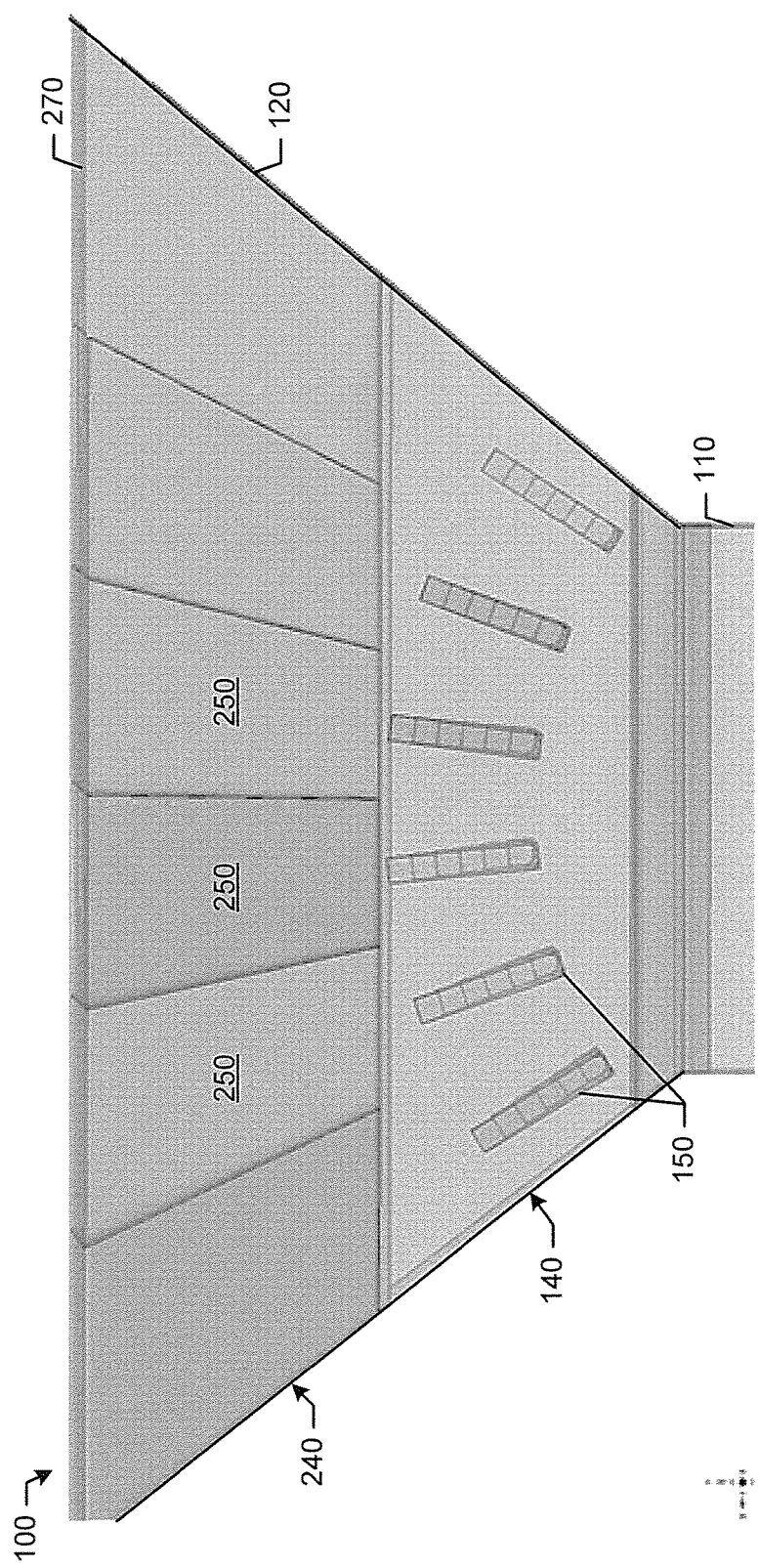
FIG. 4 is a front plan view of the selective catalyst reduction system of FIG. 2.

FIGS. 2-4 show schematic diagrams of an example of a selective catalyst reduction system 100 as may be described herein. The selective catalyst reduction system 100 may be used with the gas turbine engine 10 and the like. The selective catalyst reduction system 100 may include an inlet section 110. The inlet section 110 may be in communication with the combustion gas stream 35 from the turbine 40 via the ducting 60 and the like. The inlet section 110 may have a substantially vertical orientation 115. The vertical orientation 115 may turn the combustion gas stream 35 in a substantially vertical or upward direction. The inlet section 110 may have any suitable size, shape, or configuration. The inlet section 110 may lead to a diffuser section 120. The diffuser section 120 may direct the combustion gas stream 35 through a casing of progressively increasing cross sectional area in the direction of the flow with increasing static pressure. The diffuser section 120 may have any suitable size, shape, or configuration. A catalyst 130 may be positioned about the diffuser section 120. The catalyst 130 may be of conventional design and may be manufactured from suitable carrier and active catalytic components. Different types of catalysts 130 may be used herein. The catalyst 130 may have any suitable size, shape, or configuration. An injector (not shown) may be positioned about the catalyst 130 so as to inject a reductant into the combustion gas stream 35. Other components and other configurations may be used herein.

The selective catalyst reduction system 100 also may include a tempering air system 140. The tempering air system 140 may be positioned about the inlet section 110 in line with the incoming combustion gas stream 35. As described above, the tempering air system 140 may reduce the temperature of the combustion gas stream 35 and substantially even out the flow distribution profile before the stream 35 reaches the catalyst 130.

Figure 5:
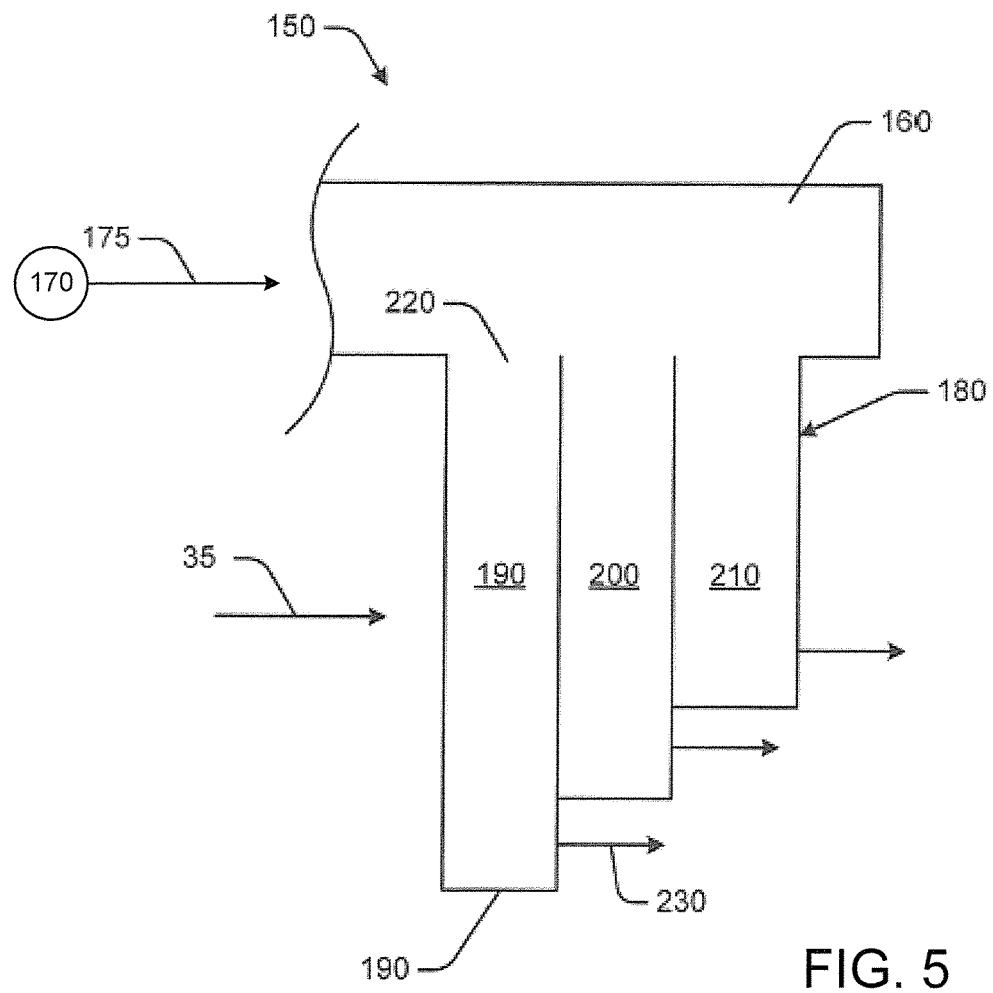
FIG. 5 is a side plan view of a finger mixer that may be used with the selective catalyst reduction system of FIG. 2.

The tempering air system 140 may include a finger mixer 150. Generally described, the finger mixer 150 may include a number of finger-like elements protruding into the combustion gas stream 35. As is shown in FIG. 5, the finger mixer 150 may include an inlet air duct 160. The inlet air duct 160 may be in communication with an air supply 170 or other type of air movement device so as to provide a cooling air stream 175 into the combustion gas stream 35. The air supply 170 may be of conventional design and may have any suitable size, shape, configuration, or capacity.

The inlet air duct 160 of the finger mixer 150 may be in communication with a number of finger ducts 180. In this example, a first finger duct 190, a second finger duct 200, and a third finger duct 210 are shown, although any number of the finger ducts 180 may be used herein. The finger ducts 180 may be in the form of tubular elements with a rectangular or a square cross-sectional shape and the like. The finger ducts 180 may be arranged adjacent to each other. The finger ducts 180 may have a progressively reduced length with the first finger duct 190 being the longest and, hence, penetrating further into the flow of the combustion gas stream 35 as compared to the following finger ducts 180. As is shown, an assembled array of the finger ducts 180 may have a substantially triangular configuration and the like. Each of the finger ducts 180 may have an inlet 220 in communication with the inlet air duct 160 and an outlet 230 positioned about the combustion gas stream 35 so to inject the cooling air stream 175 therein. Multiple outlets 230 also may be used along the length of each of the finger ducts 180. The finger ducts 180 may have any suitable size, shape, or configuration. Other components and other configurations may be used herein.

The tempering air system 140 also may include a mixing section 240. The mixing section 240 may be positioned downstream of the finger mixer 150. The mixing section 240 may include a number of mixing plates 250. The mixing plates 250 may extend vertically and horizontally (as viewed from the top) in a number of columns and rows so as to form a number of mixing boxes 260. The mixing plates 250 and the mixing boxes 260 may have any suitable size, shape, or configuration. Any number of the mixing plates 250 and the mixing boxes 260 may be used herein. The mixing boxes 260 may define a plurality of mixing tunnels 270 therethrough. The mixing tunnels 270 may have any suitable size, shape, or configuration. The mixing tunnels 260 may cause the combustion gas stream 35 and the cooling air stream 175 to mix uniformly therein. Any shape that causes the gas stream to deviate and mix may be used herein. Other components and configurations also may be used herein.

In use, the hot combustion gas stream 35 from the turbine 40 enters the inlet section 110 of the selective catalyst reduction system 100 via the ducting 60 and turns upward given the vertical orientation 115. The hot combustion gas stream 35 passes through and around the finger ducts 180 of the finger mixer 150 while the cooling air stream 175 from the air supply 170 and the inlet duct 160 is injected into the combustion gas stream 35 through the outlets 230 of the finger ducts 180. The combustion gas stream 35 and the cooling air stream 175 thus begin to mix so as to reduce the overall stream temperature. Such mixing is further promoted as the combustion gas stream 35 and the cooling air stream 175 flow through the mixing tunnels 270 of the mixing boxes 260 of the mixing section 240. Moreover, the mixing boxes 160 substantially even out the overall temperature distribution profile of the flow. The now cooled and mixed stream 35 then may continue through the diffuser section 120 and about the catalyst 130 for reaction therewith.

The selective catalyst reduction system 100 with the tempering air system 140 thus cools the combustion gas stream 35 from the turbine 40 to within an appropriate temperature range for efficient use with the catalyst 130. Specifically, the finger mixers 150 inject the appropriate volume of the cooling air stream 175 while the mixing boxes 260 and the mixing tunnels 270 therethrough stabilize the flow and improve the overall flow distribution to the catalyst 130. The tempering air system 140 also may be used in processes other than a selective catalyst reduction system that may require cooling a flow with an even flow profile.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A selective catalyst reduction system for use with a combustion gas stream, comprising:
    a tempering air system;
    the tempering air system comprising a finger mixer and a plurality of mixing boxes positioned downstream of the finger mixer;
    wherein the finger mixer comprises a plurality of finger ducts of progressively reduced length; and
    a catalyst positioned downstream of the tempering air system;
    wherein the tempering air system cools the combustion gas stream before the combustion gas stream reaches the catalyst.

2. The selective catalyst reduction system of claim 1, wherein the finger mixer of the tempering air system injects a cooling air stream into the combustion gas stream.

3. The selective catalyst reduction system of claim 2, wherein the finger mixer comprises an air supply for the cooling air stream.

4. The selective catalyst reduction system of claim 3, wherein the finger mixer comprises an inlet air duct in communication with the air supply.

5. The selective catalyst reduction system of claim 4, wherein the finger mixer comprises a plurality of finger ducts.

6. The selective catalyst reduction system of claim 5, wherein the plurality of finger ducts comprises an inlet in communication with the air inlet duct and an outlet for injecting the cooling air stream into the combustion gas stream.

7. The selective catalyst reduction system of claim 1, wherein the plurality of finger ducts comprises a substantial triangular configuration.

8. The selective catalyst reduction system of claim 1, wherein the plurality of mixing boxes comprises a plurality of mixing plates.

9. The selective catalyst reduction system of claim 8, wherein the plurality of mixing plates is arranged in a plurality of columns and a plurality of rows.

10. The selective catalyst reduction system of claim 1, wherein the plurality of mixing boxes defines a plurality of mixing tunnels.

11. The selective catalyst reduction system of claim 1, wherein the tempering air system is positioned about a selective catalyst reduction system inlet section.

12. The selective catalyst reduction system of claim 11, wherein the inlet section comprises a vertical orientation so as to turn the combustion gas stream in a vertical direction.

13. The selective catalyst reduction system of claim 1, wherein the catalyst is positioned about a selective catalyst reduction system diffuser section.

14. A tempering air system for use with a combustion gas stream entering a selective catalyst reduction system, comprising:
    a cooling air stream;
    a finger mixer for injecting the cooling air stream into the combustion gas stream;
    wherein the finger mixer comprises a plurality of finger ducts of progressively reduced length; and
    a plurality of mixing boxes positioned downstream of the finger mixer to mix the cooling air stream and the combustion gas stream into a substantially uniform profile.

15. The tempering air system of claim 14, wherein the finger mixer comprises an air supply for the cooling air stream.

16. The selective catalyst reduction system of claim 14, wherein the plurality of mixing boxes comprises a plurality of mixing plates.

17. The selective catalyst reduction system of claim 14, wherein the plurality of mixing boxes defines a plurality of mixing tunnels.

\* \* \* \* \*